United States Patent
Zhang

(10) Patent No.: US 9,560,016 B2
(45) Date of Patent: Jan. 31, 2017

(54) SUPPORTING IP ADDRESS OVERLAPPING AMONG DIFFERENT VIRTUAL NETWORKS

(71) Applicant: FutureWei Technologies, Inc., Plano, TX (US)

(72) Inventor: Hong Zhang, Palo Alto, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 909 days.

(21) Appl. No.: 13/874,318

(22) Filed: Apr. 30, 2013

(65) Prior Publication Data

US 2014/0325637 A1 Oct. 30, 2014

(51) Int. Cl.
- *G06F 15/16* (2006.01)
- *H04L 29/06* (2006.01)
- *H04L 29/12* (2006.01)
- *H04L 12/46* (2006.01)

(52) U.S. Cl.
CPC ....... *H04L 63/0272* (2013.01); *H04L 12/4633* (2013.01); *H04L 12/4641* (2013.01); *H04L 61/2514* (2013.01); *H04L 61/2517* (2013.01); *H04L 61/2535* (2013.01); *H04L 63/162* (2013.01)

(58) Field of Classification Search
CPC ... H04L 63/0272; H04L 12/4641; H04L 61/25
USPC ........................................................ 709/245
See application file for complete search history.

(56) References Cited

U.S. PATENT DOCUMENTS

| 9,094,462 B2 * | 7/2015 | Zhao | H04L 69/326 |
| 2006/0020688 A1 * | 1/2006 | Chang | H04L 29/12066 |
| | | | 709/219 |
| 2010/0318665 A1 * | 12/2010 | Demmer | H04L 41/12 |
| | | | 709/227 |

OTHER PUBLICATIONS

Mahalingam, M., et al., "VXLAN: A Framework for Overlaying Virtualized Layer 2 Networks over Layer 3 Networks," Feb. 22, 2013, pp. 1-22.

* cited by examiner

*Primary Examiner* — Wing F Chan
*Assistant Examiner* — Andrew Woo
(74) *Attorney, Agent, or Firm* — Slater Matsil, LLP

(57) ABSTRACT

System and method embodiments are disclosed here to resolve Internet Protocol (IP) address overlap of Virtual eXtensible Local Area Network (VXLAN) endpoints in packets forwarded between the VXLAN and an external or public network. An embodiment method includes assigning different port number ranges to different virtual private networks of the VXLAN, mapping private IP addresses for endpoints at the virtual private networks to corresponding public IP addresses known to a public network, and mapping local ports of the endpoints to corresponding port numbers from the port number ranges assigned to the virtual private networks, wherein each of the endpoints at the virtual private networks is assigned to a unique combination of public IP address and port number. The mapping can be done at a VXLAN gateway or at the endpoints on physical servers of the virtual private networks.

17 Claims, 2 Drawing Sheets

SUPPORTING IP ADDRESS OVERLAPPING AMONG DIFFERENT VIRTUAL NETWORKS

TECHNICAL FIELD

The present invention relates to the field of network communications and optimization, and, in particular embodiments, to a system and method to support IP address overlapping among different virtual networks.

BACKGROUND

Server virtualization poses issues in data center networks, such as having the range of virtual network restricted to L2 domain, Media Access Control (MAC) address table overflow on Ethernet switches, and limited IDs to partition traffic for different virtual machines (VMs), on physical servers, also referred to as hosts. Virtual eXtensible Local Area Network (VXLAN) is an overlay technology that addresses the above issues. A VXLAN is a network virtualization technology to segregate traffic in a physical data network into multiple virtual networks. VXLAN extends a L2 virtual network across L3 networks by tunneling the L2 MAC traffic from the individual VMs over the L3 Internet Protocol (IP) core network. Each VXLAN endpoint, e.g., at a physical server comprising VMs, can encapsulate VM traffic into an IP tunnel upon egress and decapsulate VM traffic upon ingress. Thus, each individual VM's IP address is kept private and hidden to external switches.

The VXLAN divides a physical network into multiple virtual private networks using a different VXLAN ID (VNI) to uniquely identify each virtual private network. Each encapsulated packet carries a VNI, and hence the VM traffic can be classified into different partition domains. Since different virtual private networks can be owned and managed by different tenants (e.g., operators or administrators), the private IP addresses assigned to endpoints in these virtual private networks could overlap. The endpoints can be VMs or applications running on a VM. When these endpoints communicate with an external endpoint, e.g., in a public network, a mechanism is needed to translate these overlapping IP addresses into unique public IP addresses in order to avoid ambiguity and ensure proper packet forwarding and operations.

SUMMARY OF THE INVENTION

In accordance with an embodiment, a method is implemented at a network device for translating data packets between a Virtual Extensible Local Area Network (VXLAN) and an external network. The method includes receiving, from a plurality of first endpoints in a first virtual private network of the VXLAN and a plurality of second endpoints in a second virtual private network of the VXLAN, a plurality of data packets including a plurality of private addresses and local port numbers. The first private virtual network is assigned a first port number range and the second private network is assigned a second port number range different from and non-overlapping with the first port number range. The private addresses and local port numbers in the received data packets from the first endpoints are replaced with a plurality of corresponding public addresses and a plurality of corresponding first mapped port numbers selected from the first port number range. The private addresses and local port numbers in the received data packets from the second endpoints are also replaced with a plurality of corresponding public addresses and a plurality of corresponding second mapped port numbers selected from the second port number range.

In accordance with another embodiment, a method is implemented at a network component for translating addresses of incoming and outgoing data packets for a VXLAN. The method includes assigning a plurality of different and non-overlapping port number ranges to a plurality of corresponding virtual private networks of the VXLAN. Each of the virtual private networks of the VXKAN comprises one or more endpoints. A private Internet Protocol (IP) address for each of the endpoints is mapped to a corresponding public IP address known to a public network. A local port number for each of the endpoints is also mapped to a corresponding translated port number selected from one of the corresponding port number ranges that is assigned to the same virtual private network as the endpoint. For each of the endpoints, a private IP address and local port number combination is mapped to a public IP number and translated port number combination that is different from the other endpoints.

In accordance with yet another embodiment, a network component at a VXLAN includes a processor and a computer readable storage medium storing programming for execution by the processor. The programming includes instructions to receive, from a plurality of endpoints in a virtual private network of the VXLAN, a plurality of data packets including a plurality of private addresses and local port numbers. The private virtual network is assigned a port number range that is different and non-overlapping with one or more other port number ranges assigned to one or more other virtual private networks of the VXLAN. The private addresses and local port numbers in the data packets from the endpoints are replaced with a plurality of corresponding public addresses and a plurality of corresponding mapped port numbers selected from the port number range. The data packets including the public addresses and the mapped port numbers are then forwarded to a public network.

It should be understood that the embodiments above are provided as illustrative embodiments. The disclosed steps and elements of the embodiments may be implemented using any number of techniques and components, whether currently known or in existence. The disclosure should in no way be limited to only the illustrative embodiments, but may be modified within the scope of the appended claims along with their full scope of equivalents. The scope encompasses any changes, combinations, or substitutions to the illustrative embodiments that are apparent to persons skilled in the art.

BRIEF DESCRIPTION OF THE DRAWINGS

For a more complete understanding of the present invention, and the advantages thereof, reference is now made to the following descriptions taken in conjunction with the accompanying drawing, in which.

Figure 1:
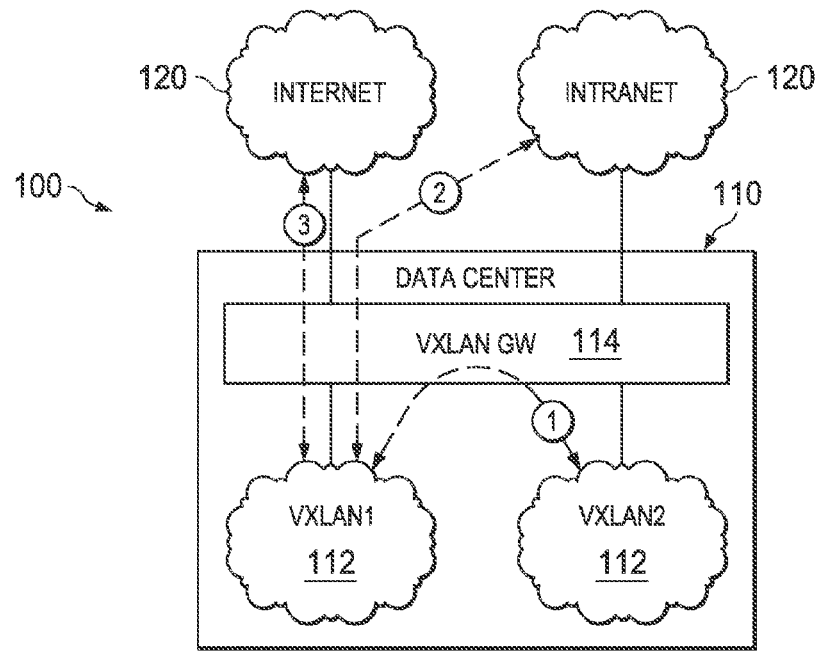
FIG. 1 is an example of a VXLAN architecture.

The drawings above are provided for illustrative purpose and should in no way be limiting to the scope of the disclosure. The components and steps in the drawings may be modified within the scope of the appended claims along with their full scope of equivalents. The scope encompasses any changes, combinations, or substitutions to the illustrative components and steps of the drawings that are apparent to persons skilled in the art.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The private IP addresses assigned to endpoints (e.g., VMs) in different virtual private networks of a VXLAN may overlap since the endpoints' IP addresses are hidden from external networks (e.g., a public network such as the Internet). The local private IP addresses at a virtual private network, for instance in a data center, may also be hidden from other virtual private networks in the same data center. When these endpoints communicate with an external endpoint in a public or external network, such as an external network node/router/switch, a mechanism is needed to translate these overlapping IP addresses into unique public IP addresses in order to avoid ambiguity and ensure proper forwarding of packets between the virtual private networks on one side and the public network on the other side. For example, a packet from the public network with an overlapping IP address may be forwarded to the wrong virtual private network or to multiple private networks at the data center.

Various embodiments are provided to resolve this issue by mapping, according to a determined mapping assignment, the endpoint addresses of different virtual private network on egress into unique public addresses. Using the same mapping assignment, incoming packets with public addresses are then mapped, at ingress of each of the virtual private networks, into the corresponding endpoints' private addresses of that virtual private network. The mapping can be done at a gateway (e.g., a VXLAN gateway, that handles packet forwarding between the different virtual private networks on one side (e.g., at a data center) and the public network on the other side. Alternatively, the mapping can be done at the endpoints on physical servers of the VXLAN virtual private networks. The mapping of unique addresses is achieved by assigning a unique port range to each virtual private network and mapping the endpoints in the different virtual private networks to port numbers in different ranges so that each endpoint in a virtual private network is assigned to a unique combination of public IP address and port number. The embodiments herein are illustrative embodiments and do not limit the scope of the disclosure. Variations, combinations, and/or modifications of the embodiments and/or features of the embodiments made by a person having ordinary skill in the art are within the scope of the disclosure. Alternative embodiments that result from combining, integrating, and/or omitting features of the embodiments are also within the scope of the disclosure.

FIG. 1 shows an example of a VXLAN architecture 100, where the mapping of unique addresses above can be implemented. The VXLAN architecture 100 includes a plurality of virtual private networks 112 of a VXLAN (labeled VXLAN1, VXLAN2, . . . ). The virtual private networks 112 may be located in a data center 110. Each virtual private network 112 may comprise one or more VMs and endpoints (not shown). The virtual private networks 112 are coupled to a VXLAN Gateway (GW) 114, e.g., in the same data center 110. The VXLAN GW 114 allows the virtual private networks 112 to communicate with each other (as shown in link 1) and with external or public networks 120 (as shown in links 2 and 3), e.g., Internet, Intranet, and/or other networks. The components of the VXLAN architecture 100 may be arranged as shown in FIG. 1 or in any other suitable arrangement.

In an embodiment, the VXLAN GW 114 is configured to translate or map IP addresses that may overlap in packets from the virtual private networks 112 into unique IP addresses before forwarding the packets to the external or public networks 120. A unique and different port range can be assigned to each of the virtual private networks 112. Accordingly, the endpoints (not shown) in the different virtual private networks 112 are assigned to port numbers in different ranges so that each endpoint in a virtual private network has a unique combination of a port number and IP address.

For example, for a given host (e.g., physical server comprising endpoints or VMs), a first port range 100 to 199 is assigned to a first virtual private network 112 (e.g., VXLAN1) associated with a first VNI (VNI1). A second port range 200 to 299 is assigned to a second virtual private network 112 (e.g., VXLAN2) associated with a second VNI (VNI2). Similarly, all remaining virtual private network 112 are assigned corresponding unique port ranges.

In an example of the mapping scheme for a host, endpoints at VXLAN2 are mapped in the packets (e.g., at the endpoints or a VXLAN GW) as follows. Private IP address 10.2.2.1 local port 20 for endpoint1 is mapped to public IP address 203.31.208.1 and port 200. Private IP address 10.2.2.1 and local port 21 for endpoint1 is mapped to public IP address 203.31.208.1 and port 201. Private IP address 10.2.2.2 and local port 20 for endpoint2 is mapped to public IP address 203.31.208.2 and port 200. Private IP address 10.2.2.2 and local port 21 for endpoint2 is mapped to public IP address 203.31.208.2 and port 201. Additionally, endpoints at VXLAN3 are mapped as follows. Private IP address 10.2.2.1 and local port 20 for endpoint3 is mapped to public IP address 203.31.208.1 and port 300. Private IP address 10.2.2.1 and local port 21 for endpoint3 is mapped to public IP address 203.31.208.1 and port 301. Private IP address 10.2.2.2 and local port 20 for endpoint4 is mapped to public IP address 203.31.208.2 and port 300. Private IP address 10.2.2.2 and local port 21 for endpoint4 is mapped to public IP address 203.31.208.2 and port 301. Through the above mapping, although endpoint1 in VXLAN2 and endpoint3 in VXLAN3 have the same private IP addresses and local port numbers, their port numbers are mapped to different ranges resulting in different combinations of public IP address and port number.

As a packet passes from a virtual private network to a public network, the above mapping mechanism changes not just the source IP address but also the port number, e.g., in a Transmission Control Protocol (TCP) or User Datagram Protocol (UDP) header. As such, the packet is sent out with a unique combination of source address and port. An incoming packet (from the public network to the virtual private network) includes the same unique combination of address and port, and can be translated back to the original virtual networks' private IP address and local port in a reverse mapping. The mapping can be established by replacing the addresses in the packet. The mapping and translation schemes above can also be implemented in VXLAN systems currently known or in existence that may be similar or different than the VXLAN architecture 100. The mapping and translation may be achieved using VXLAN endpoints and/or gateways or any other suitable components or devices using software/hardware.

Figure 2:
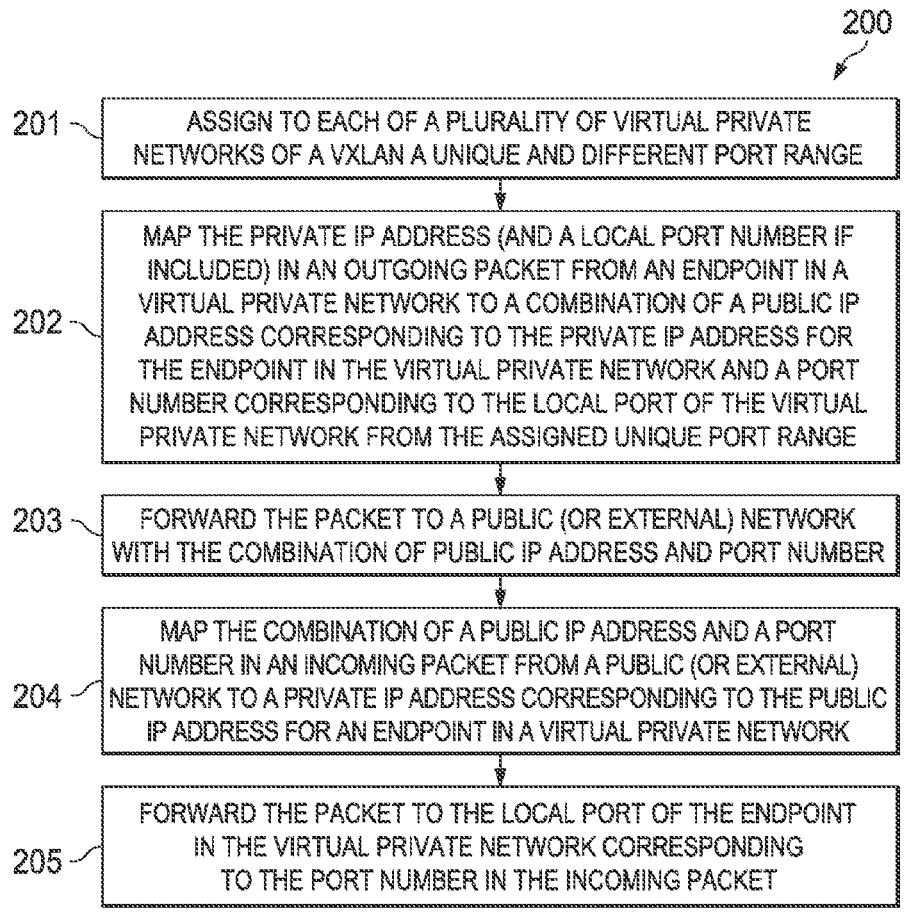
FIG. 2 is a flow diagram of an example embodiment for address mapping to support IP address overlap among different virtual private networks.

FIG. 2 is a flow diagram 200 towards an exemplary embodiment for address mapping to support IP address overlap among different virtual private networks. The address mapping can be implemented at the VXLAN GW, the endpoints at the virtual private networks of a VXLAN, or any other suitable network components via software and/or hardware implementation according to the mapping mechanism above to guarantee unique IP address and port number combinations for endpoints at different virtual private networks. At step 201, each of the virtual private networks is assigned a unique and different port range. At step 202, the private IP address (and a local port number if included) in an outgoing packet from an endpoint in a virtual private network is mapped to (e.g., replaced by) a combination of a public IP address corresponding to the private IP address for the endpoint in the virtual private network and a mapped or translated port number corresponding to the local port of the virtual private network from the assigned unique port range. At step 203, the packet is forwarded to a public (or external) network with the combination of public IP address and translated port number. At step 204, the combination of public IP address and translated port number in an incoming packet from a public (or external) network is mapped to (e.g., replaced by) a private IP address corresponding to the public IP address for an endpoint in a virtual private network. A local port number for the endpoint corresponding to the translated port number in the incoming packet can also be added with the private IP address. At step 205, the packet is forwarded to the local port of the endpoint in the virtual private network corresponding to the translated port number in the incoming packet.

Figure 3:
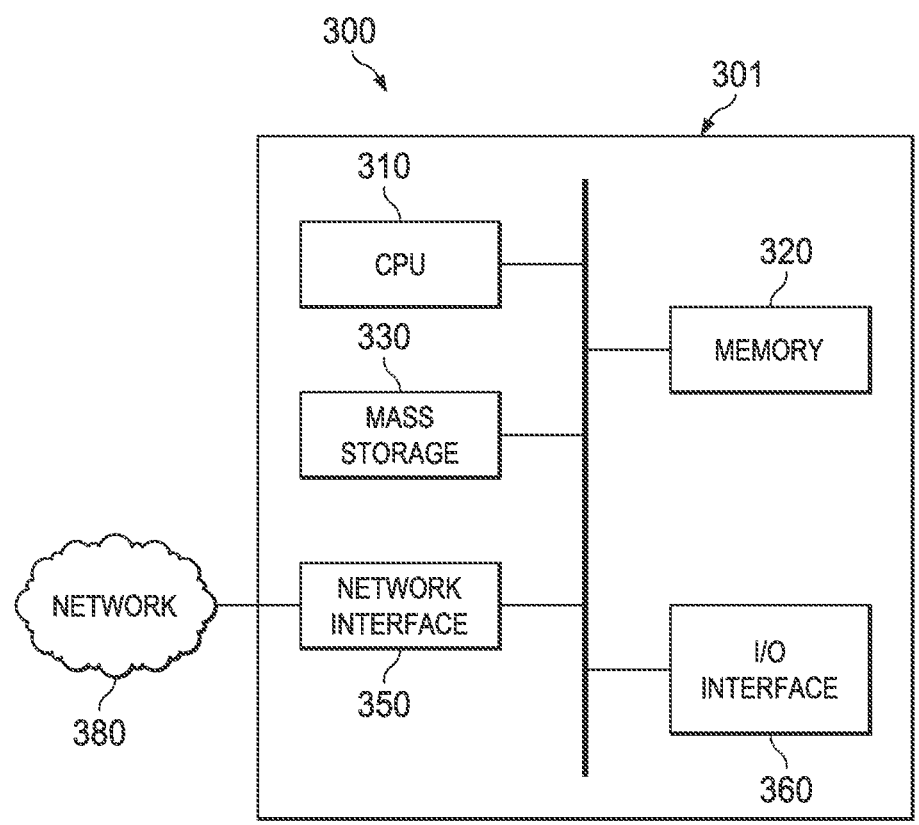
FIG. 3 is a diagram of an exemplary processing system that can be used to implement various embodiments.

FIG. 3 is a block diagram of an exemplary processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. Various changes, substitutions and alterations can be made without departing from the spirit and scope of this disclosure as defined by the appended claims. The scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. At a network device, a method for translating data packets between a Virtual Extensible Local Area Network (VXLAN) and an external network, the method comprising:
receiving, from a plurality of first endpoints in a first virtual private network of the VXLAN and a plurality of second endpoints in a second virtual private network of the VXLAN, a plurality of data packets including a plurality of private addresses and local port numbers, wherein the first private virtual network is assigned a first external port number range and the second virtual private network is assigned a second external port number range different from and non-overlapping with the first external port number range, and wherein at least one of the first endpoints in the first virtual private network is assigned a same private address as at least one of the second endpoints in the second virtual private network;
replacing the private addresses and local port numbers in data packets of the plurality of data packets originating from the first endpoints with a plurality of corresponding first public addresses and a plurality of corresponding first mapped port numbers selected from the first external port number range;
replacing the private addresses and local port numbers in data packets of the plurality of data packets originating from the second endpoints with a plurality of corresponding second public addresses and a plurality of corresponding second mapped port numbers selected from the second external port number range, wherein the at least one of the first endpoints in the first virtual private network is assigned a same corresponding public address as the at least one of the second endpoints in the second virtual private network; and forwarding the plurality of data packets to the external network, wherein the data packets originating from each of the endpoints comprise a unique combination of public address and mapped port number.

2. The method of claim 1, wherein each of the first endpoints is assigned a different private address and corresponding public address from the other first endpoints and the second endpoints, wherein each of the second endpoints is assigned a different private address and corresponding public address from the other second endpoints and the first endpoints.

3. The method of claim 1, wherein, for each of the first endpoints and second endpoints having a plurality of ports, each of the ports is assigned a different local port number than the other ports.

4. The method of claim 3, wherein one of the ports of one of the first endpoints is assigned a same local port number as one of the ports of another of the first endpoints, and wherein one of the ports of one of the second endpoints is assigned a same local port number as one of the ports of another of the second endpoints.

5. The method of claim 3, wherein one of the ports of one of the first endpoints is assigned a same local port number as one of the ports on one of the second endpoints.

6. The method of claim 1, wherein the first virtual private network is associated with a plurality of host servers, wherein the plurality of first endpoints comprises endpoints that belong to different host servers, and wherein each of the endpoints that belong to different host servers are assigned different private addresses and corresponding public addresses.

7. The method of claim 1, wherein the private addresses of the first endpoints and the second endpoints are Internet Protocol (IP) addresses that are hidden in the first virtual private network and the second virtual private network from the external network.

8. At a network component, a method for translating addresses of incoming and outgoing data packets for a Virtual Extensible Local Area Network (VXLAN), the method comprising:

assigning a plurality of different and non-overlapping external port number ranges to a plurality of corresponding virtual private networks of the VXLAN, wherein the plurality of corresponding virtual private networks comprises a plurality of first endpoints in a first virtual private network and a plurality of second endpoints in a second virtual private network;

mapping a private Internet Protocol (IP) address for each of the first and second endpoints to a corresponding public IP address known to a public network, wherein at least one of the first endpoints in the first virtual private network has a same private IP address as at least one of the second endpoints in the second virtual private network, and wherein the at least one of the first endpoints in the first virtual private network has a same corresponding public IP address as the at least one of the second endpoints in the second virtual private network;

mapping a local port number for each of the first and second endpoints to a corresponding translated port number selected from the corresponding external port number range that is assigned to the corresponding virtual private network of each of the first and second endpoints, wherein, for each of the first and second endpoints, the corresponding public IP address and the corresponding translated port number combination is different from the public IP address and the translated port number combination assigned to each of the other first and second endpoints;

receiving a data packet from a source endpoint in the plurality of first endpoints or in the plurality of second endpoints, wherein the data packet includes the private IP address and the local port number of the source endpoint;

replacing the private IP address and the local port number in the data packet by the corresponding public IP address and the corresponding translated port number; and forwarding the data packet to the public network.

9. The method of claim 8 further comprising:

receiving a data packet from the public network, wherein the data packet includes the public IP address and the translated port number of one of the endpoints in one of the virtual private networks;

replacing the public IP address and the translated port number in the data packet by the private IP address and the local port number of the one of the endpoints; and forwarding the data packet to the one of the endpoints.

10. The method of claim 8, wherein at least one of the virtual private networks in the plurality of corresponding virtual private networks is associated with a plurality of host servers, wherein each of the host servers comprises one or more endpoints, and wherein the endpoints at different host servers have different private addresses and corresponding public addresses.

11. The method of claim 10, wherein the endpoints at different host servers have a same corresponding translated port number selected from the corresponding external port number range that is assigned to the virtual private network associated with different host servers.

12. A network component at a Virtual Extensible Local Area Network (VXLAN), the network component comprising:

a processor; and a computer readable storage medium storing programming for execution by the processor, the programming including instructions to:

receive, from a plurality of first endpoints in a first virtual private network of the VXLAN and a plurality of second endpoints in a second virtual private network of the VXLAN, a plurality of data packets including a plurality of private addresses and local port numbers, wherein the first private virtual network is assigned a first external port number range and the second virtual private network is assigned a second external port number range different from and non-overlapping with the first external port number range, wherein at least one of the first endpoints in the first virtual private network is assigned a same private address as at least one of the second endpoints in the second virtual private network;

replace the private addresses and local port numbers in data packets of the plurality of data packets originating from the first endpoints with a plurality of corresponding first public addresses and a plurality of corresponding first mapped port numbers selected from the first external port number range;

replacing the private addresses and local port numbers in data packets of the plurality of data packets originating from the second endpoints with a plurality of corresponding second public addresses and a plurality of corresponding second mapped port numbers selected from the second external port number range, wherein the at least one of the first endpoints in the first virtual private network is assigned a same corresponding public address as the at least one of the second endpoints in the second virtual private network;

forward the data packets to a public network;

receive, from the public network, data packets, each including a corresponding public address and a corresponding mapped port number;

replace the corresponding public addresses and corresponding mapped port numbers in the data packets with the corresponding private addresses and corresponding local port numbers; and forward the data packets to the endpoints according to the corresponding private addresses and corresponding local port numbers.

13. The network component of claim 12, wherein the network component is a VXLAN gateway coupled to the first virtual private network, the second virtual private network, and the public network.

14. The network component of claim 12, wherein the network component is located at one of the endpoints of the first virtual private network and is coupled to the public network.

15. The network component of claim 12, wherein the network component is located at one or more host servers at a data center, wherein the data center comprises the first virtual private network and the second virtual private network.

16. The network component of claim 12, wherein the endpoints are virtual machines (VMs) or VM applications on one or more host servers.

17. The network component of claim 12, wherein the private addresses and local port numbers or the public addresses and mapped port numbers are included in a Transmission Control Protocol (TCP) or User Datagram Protocol (UDP) header of the data packets.

* * * * *